US008457950B1

(12) United States Patent
Gardner et al.

(10) Patent No.: US 8,457,950 B1
(45) Date of Patent: Jun. 4, 2013

(54) SYSTEM AND METHOD FOR COREFERENCE RESOLUTION

(71) Applicant: Digital Reasoning Systems, Inc., Franklin, TN (US)

(72) Inventors: James Johnson Gardner, Nashville, TN (US); Vishnuvardhan Balluru, Franklin, TN (US); Phillip Daniel Michalak, Spring Hill, TN (US); Kenneth Loran Graham, Nashville, TN (US); John Wagster, Nashville, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 0 days.

(21) Appl. No.: 13/666,722

(22) Filed: Nov. 1, 2012

(51) Int. Cl.
*G10L 15/00* (2006.01)

(52) U.S. Cl.
USPC ............... 704/9; 704/10; 707/755; 715/256

(58) Field of Classification Search
USPC ................... 704/9, 10; 707/755; 715/256
See application file for complete search history.

(56) References Cited

U.S. PATENT DOCUMENTS

| 5,794,194 | A  | * | 8/1998  | Takebayashi et al. | 704/251 |
|-----------|----|---|---------|--------------------|---------|
| 6,405,162 | B1 | * | 6/2002  | Segond et al.      | 704/9   |
| 6,810,376 | B1 | * | 10/2004 | Guan et al.        | 704/9   |
| 7,249,117 | B2 |   | 7/2007  | Estes              |         |
| 7,634,398 | B2 | * | 12/2009 | Knoll et al.       | 704/9   |
| 7,882,055 | B2 |   | 2/2011  | Estes              |         |
| 8,015,143 | B2 |   | 9/2011  | Estes              |         |
| 2010/0250598 | A1 | * | 9/2010 | Brauer et al.    | 707/780 |
| 2012/0078613 | A1 | * | 3/2012 | Kandekar et al.  | 704/9   |

OTHER PUBLICATIONS

McCallum et al., "FACTORIE: Probabilistic Programming via Imperatively Defined Factor Graphs," 2009, *Advances in Neural Information Processing Systems 22*, pp. 1249-1257.
Singh et al., "Large-Scale Cross-Document Coreference Using Distributed Inference and Hierarchical Models," Jun. 19-24, 2011, Portland, Oregon, Proceedings of the 49th Annual Meeting of the Association for Computational Linguistics, pp. 793-803.
Understanding Alice: Synthesys Model Training, Aug. 2012, Digital Reasoning Systems, Inc. 12 pages.

* cited by examiner

*Primary Examiner* — Daniel D Abebe
(74) *Attorney, Agent, or Firm* — Christopher W. Glass, Esq.; Troutman Sanders LLP

(57) ABSTRACT

According to one aspect, a method for coreference resolution is provided. In one embodiment, the method includes receiving a segment of text that includes mentions corresponding to entities. A first feature vector is generated based on one or more features associated with a first mention, and a second feature vector is generated based on based on one or more features associated with a second mention. A measure of similarity between the first feature vector and second feature vector is computed and, based on the computed measure of similarity, it is determined if the first mention and the second mention both correspond to the same entity.

26 Claims, 6 Drawing Sheets

SYSTEM AND METHOD FOR COREFERENCE RESOLUTION

BACKGROUND

Coreference resolution can generally be defined as a process of determining whether two expressions (or "mentions") in natural language text refer to the same object (or "entity"). Given a collection of mentions of entities extracted from a body of text, coreference resolution, sometimes also referred to as entity resolution, may group the mentions such that two mentions belong to the same group ("cluster") if and only if they refer to the same entity. Because the number of mentions and entities present within text of a document or across multiple documents can reach into the thousands or tens of thousands, coreference resolution may be computationally demanding and thereby time consuming. It is with respect to these and other considerations that the various embodiments described below are presented.

SUMMARY

Concepts and technologies are described herein for coreference resolution. According to one aspect, a computer-implemented method for coreference resolution is presented. In one embodiment, the computer-implemented method includes receiving a segment of text that includes mentions corresponding to entities. A first feature vector is generated based on one or more features associated with a first mention, and a second feature vector is generated based on based on one or more features associated with a second mention. A measure of similarity between the first feature vector and second feature vector is computed and, based on the computed measure of similarity, it is determined if the first mention and the second mention both correspond to the same entity.

According to another aspect, a system for coreference resolution is presented. In one embodiment, the system includes a processing unit and a memory operatively coupled to the processing unit. The system also includes a program module that executes in the processing unit from the memory and which, when executed by the processing unit, causes the computer system to perform functions for coreference resolution. The functions include receiving a segment of text that includes mentions corresponding to entities, and generating a first feature vector based on one or more features that are associated with one or more first mentions. The functions further include generating a second feature vector based on one or more features that are associated with one or more second mentions. The functions also include computing a measure of similarity between the first feature vector and second feature vector and, based on the computed measure of similarity, determining if the one or more first mentions and the one or more second mentions both correspond to the same entity.

According to another aspect, a computer-readable storage medium is presented. The computer-readable storage medium has stored, computer-executable instructions which, when executed by a computer, cause the computer to perform functions for coreference resolution. In one embodiment, the functions include receiving a segment of text that includes mentions corresponding to entities, and generating one or more first feature vectors based on one or more features associated with first mentions. The functions further include generating one or more second feature vectors based on one or more features associated with second mentions. The functions also include computing a measure of similarity between the one or more first feature vectors and the one or more second feature vectors and, based on the computed measure of similarity, determining if one or more of the first mentions and one or more of the second mentions both correspond to the same entity.

These and other features as well as advantages will be apparent from a reading of the following detailed description and a review of the associated drawings.

DETAILED DESCRIPTION

Figure 1:
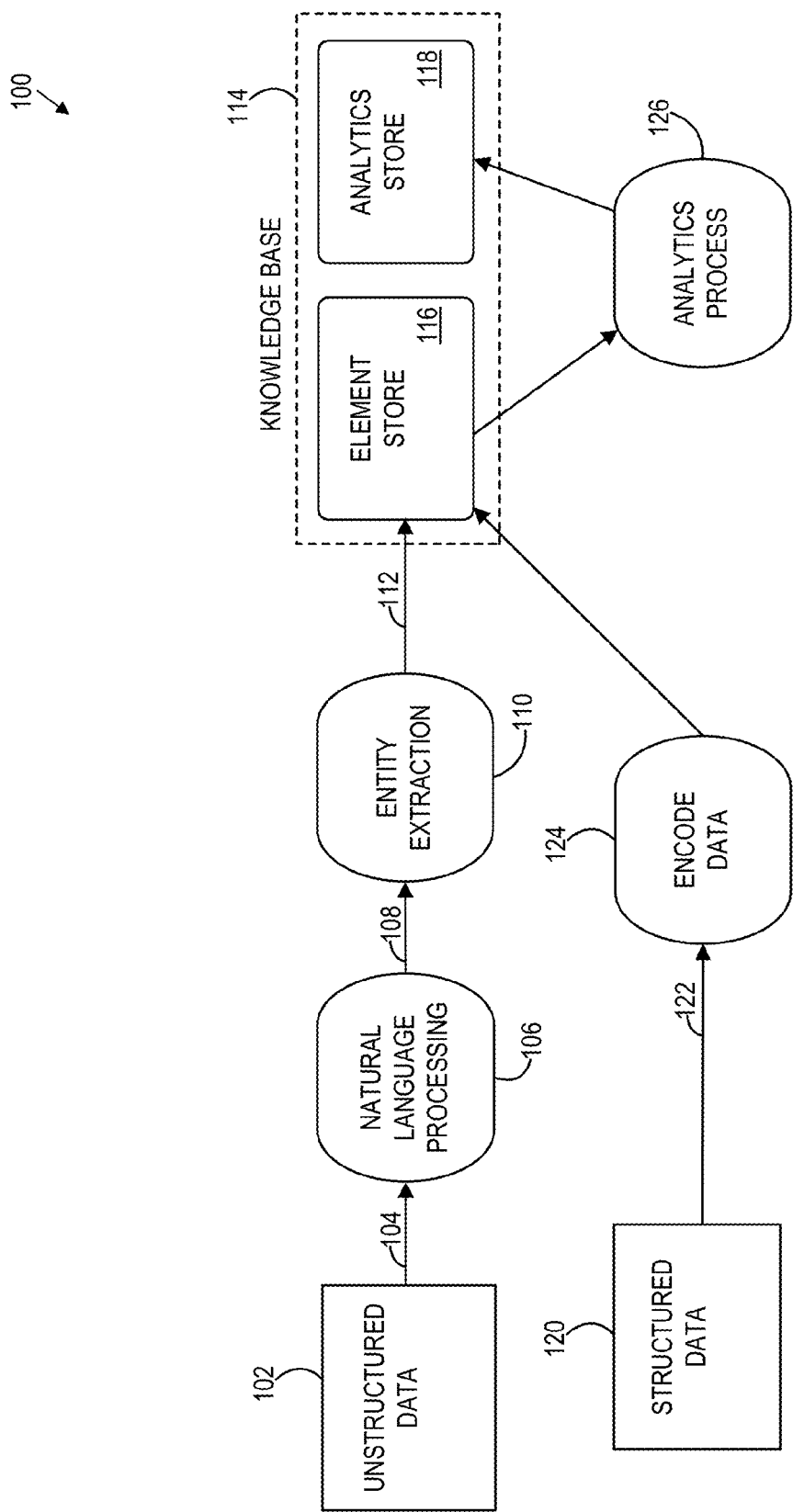
FIG. 1 is a diagram illustrating software architecture of a data processing system in which one or more embodiments described herein may be implemented.

Some references, which include various publications, are discussed in the disclosure provided herein. The citation and/or discussion of such references is provided merely to clarify the description of the present disclosure and is not an admission that any such reference is "prior art" to any aspects of the present disclosure described herein.

In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and exemplary operating environments will be described.

Figure 6:
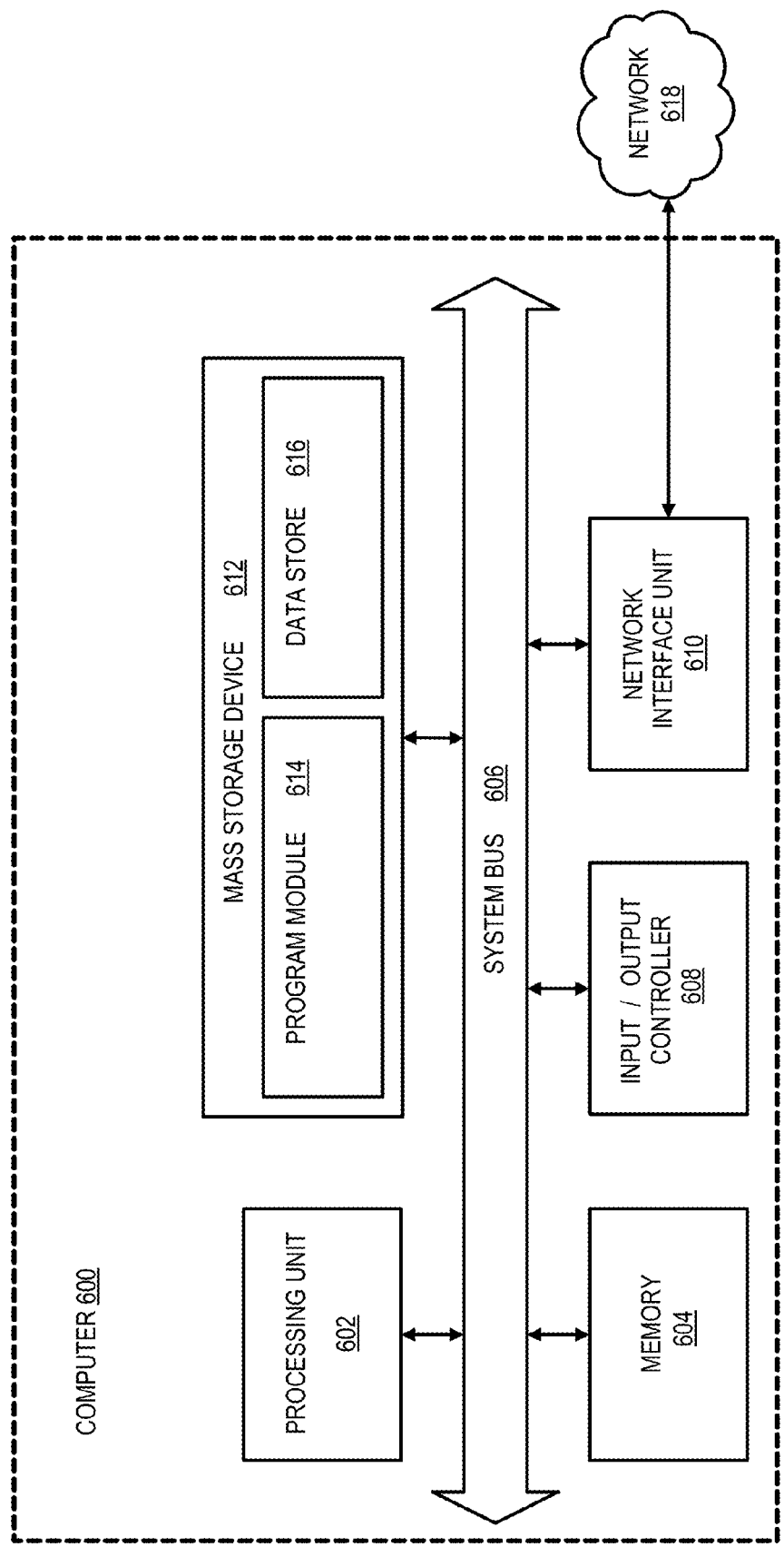
FIG. 6 is a computer architecture diagram showing an illustrative computer hardware architecture for a computing system capable of implementing the embodiments presented herein.

FIGS. 1 and 6, and the corresponding discussions, are intended to provide a brief, general description of a suitable computing environment in which the embodiments described herein may be implemented. While the subject matter described herein is presented in the general context of program modules that execute in conjunction with the execution of application modules on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 1 is a software architecture diagram for a data processing system 100 in which one or more embodiments described herein may be implemented. The system 100 includes an entity storage architecture, referred to herein as a "knowledge base" 114, which is configured to perform at scale for both data insertion and querying. The knowledge base 114 can provide the flexibility of a pluggable-type modular architecture to accommodate a variety of analytics and natural language processing ("NLP") engines. It can have combined persistent storage and intelligent data caching to allow for rapid storage and retrieval of text documents and related metadata, which may include text content of messages, categorized individual tokens and semantic token groups including those messages, and meta data such as properties, relationships, and events. As shown, the knowledge base 114 includes an element store 116 and an analytics store 118.

Structured input data 120 and unstructured input data 102 ingested according to functions performed by the data processing system 100 can be stored in the knowledge base 114. Structured data 120 may be stored in the knowledge base 114 directly in an encoded form, while the unstructured data 102 may undergo more extensive processing. Unstructured data 102 may be accepted in a UTF-8 text format 104, and structured data 120 may be accepted in a specified XML format 122, among other commonly used data formats.

The system 100 is configured to perform specific analytics functions as data is ingested and stored in the knowledge base 114, namely NLP, entity extraction processes, and various advanced analytics processes. NLP and entity extraction may be performed according to a statistical model approach, which can provide for high-quality feature identification without requiring labor-intensive rule tuning efforts. Statistical models can be easier to train and they can be easily adapted to a variety of genres of data. A first step in the unstructured ingestion process is to "tokenize" an input stream of text 104 into "terms" for NLP, shown at reference numeral 106. A term can be a word, punctuation mark, or special character. Each term is then examined in order to determine its role (entity, predicate, number, punctuation, etc.). Next, each term is assigned a part of speech ("POS"), such as proper noun, adjective, adverb, etc. Subsequently, the role and POS information is used to determine if any adjacent terms should be co joined into a single "element." As an example, "John" and "Smith" may be co joined into a single element "John Smith." This process can be referred to as "lemmatization" or "chunking" The output 108 includes elements tagged according to an assigned role. In some contexts, elements may also be referred to as entities. Elements may be treated as the smallest unit of data that is categorized and processed to determine relationships across a corpus of data.

The next step in the data ingestion process performed by system 100 is categorization of the role-tagged elements produced by the NLP, shown at reference numeral 110. This may referred to as entity (or element) extraction. Each element can be examined to determine if it should be classified as belonging to one of the categories defined by the statistical classification process. Predefined categories may be used, and additional categories may be created by marking up training files with representative examples of the elements of new categories.

Category-tagged elements 112 result from the entity extraction stage 110. At this stage of the data ingestion process, the knowledge base 114 contains the ingested files in an encoded format, where each element is tagged with role and category information. The element data store 116 contains the tables that define the input messages, the contexts making up each message, and the elements making up each context. Various analytic processes 126 can be run on the ingested data to find conceptual relationships and to resolve concepts. Concept resolution generally refers to a process of rolling up all the concepts that refer to the same entity into a global representation of that concept.

Structured input data 120 may be ingested in XML format, shown by data stream 122, and may be encoded (shown at reference numeral 124) before being stored in the knowledge base 114. Structured input data 120 can be defined by an XML file and can take the form of concepts, properties, events, and/or relationships. A concept may describe an entity, for example a person, place, or thing, through associated properties. For instance, when describing a person, associated properties of a concept may be height, weight, eye color, hair color, or bank account number. Properties may be expressed as "name:value" pairs describing attributes that can be associated with any element or concept defined in the system, for example, "weight:215," whether structured or unstructured. Properties can also be used to augment other analytics processes such as concept resolution, and may further be used to track data back to its source using a pedigree value.

Relationship data may include a name of the relationship and a list of two or more concepts and/or events that share that relationship. For example, a relationship might be "classmates," containing a list of people, that is, concepts that share the relationship. Concepts can be related to events or other concepts, and events can be related to concepts or other events. Events, also referred to herein as "temporal features" or "time features" may be defined as activities with a temporal component. A variety of methods can be used for specifying time and location, including specific time specifications with a start/end value, or a more fuzzy specification, such as "Spring." As used herein, "space" features relate to geopraphic locations ("geolocations"), which can be specified by latitude/longitude coordinates or simply by the name of a location. Some functions of language processing according to embodiments described herein can be implemented using probabilistic mathematical models (i.e. model-based machine learning). These mathematical models can encode a variety of different data features and associated weight information, which is stored in a network-based file system and can be used to re-construct a model at run time.

Using generated assertions over entities (<Assertion: Subject, Predicate, Object>), feature descriptors may be created (<Subject, Predicate>, <Object, Predicate>) appropriately for those entities. The similarity metric of two textual mentions may be improved using pair-wise correlations of entities that frequently occur in the assertions. Using geolocation labels on the entities, feature descriptors can be created which have a contextual relation with a given entity at both a sentence level and document level. Two mentions with the same name but referring to distinct elements can have a lesser likelihood of sharing the same geographic locations than the same two mentions that refer to the same element. Using temporal labels on the entities, feature descriptors can be created which have a contextual relation with a given entity at a both sentence level and document level. Two mentions with the same name but referring to distinct elements can have a lesser likelihood of sharing the same time characteristics than the same two mentions that refer to the same element. These values may be stored in the data as properties belonging to the element representing the named location and/or time.

A graph, for example as described in "FACTORIE: Probabilistic Programming via Imperatively Defined Factor Graphs," by A. McCallum, K. Schultz, and S. Singh ("McCallum et al."), may be initialized using the generated associations over mentions, leading to a faster and improved convergence. Computations of a similarity metric may be improved by utilizing available temporal features and geolocation features. Entities that have occurrences during the same time period and also the same geographical location can have a relatively high similarity.

According to embodiments described herein, a mention supports having contextual and non-contextual feature vectors to generate the similarity metric. A feature vector may be defined as an n-dimensional vector of numerical features that represent some element (or mention). Non-contextual features can be considered as those features which are constant for a given word regardless of the context. Non-contextual features may comprise tokenizer output and features at the character level for a given word, as opposed to a widely known word level in each sentence. Contextual features may comprise extractor tags and features at the word level in the sentence. Space and time may be maintained as additional features, having particular significance where a mention has either a geolocation or temporal label set. Based on the token information of a contextual feature vector, it can be inferred if a particular term has an extractor tag, and based on tokens of space and time feature vectors, it can be inferred if the particular term is a location entity or a time entity. For each mention, two lists can be maintained to include specific dependencies. Each mention may have a list of all the space entities and also another list of all the time entities that occurred in a corresponding sentence. Accordingly, when a sub-entity is created, hash-sets can be maintained for space and time, which contain the unique space and time entities that its mentions have dependencies on.

Figure 2:
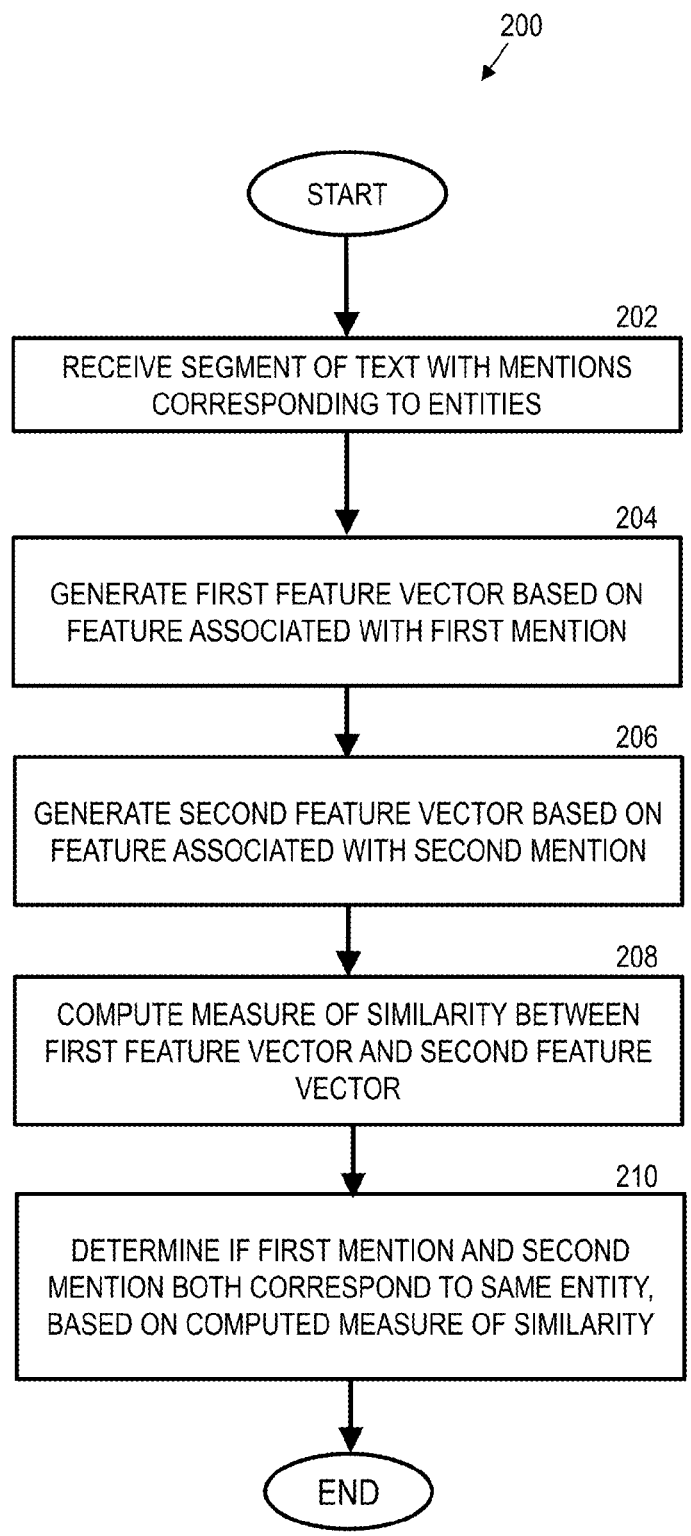
FIG. 2 is a flow diagram illustrating a routine for coreference resolution according to one embodiment.
Figure 3:
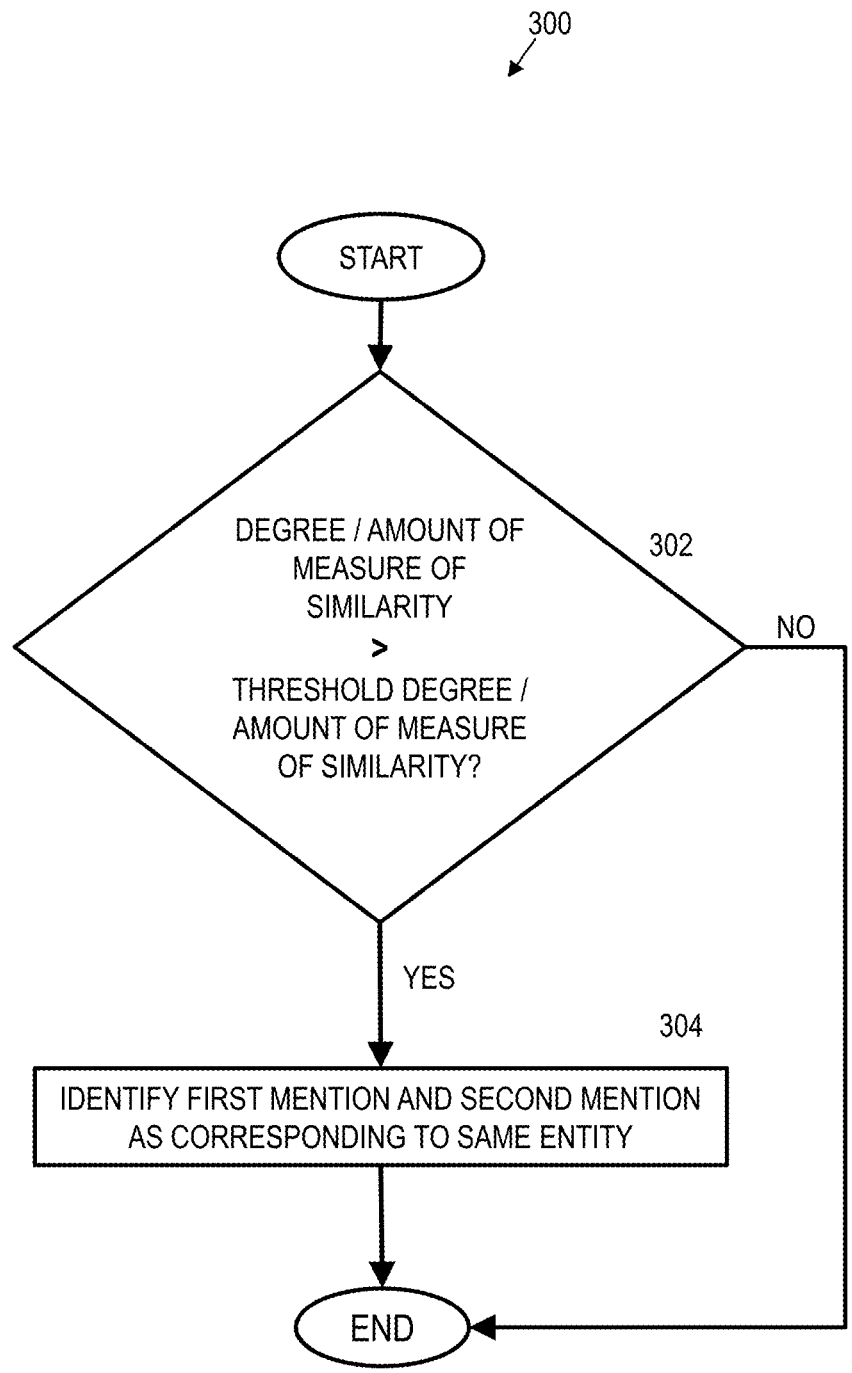
FIG. 3 is flow diagram illustrating a routine for determining feature vector similarity according to one embodiment.
Figure 4:
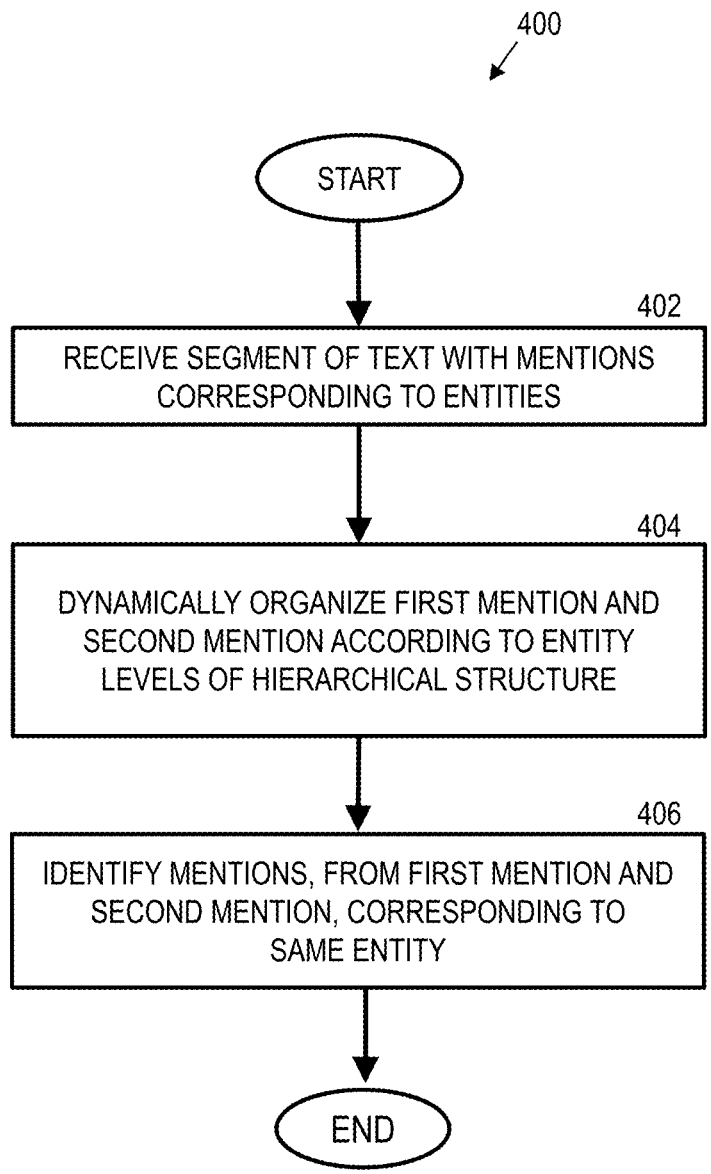
FIG. 4 is a flow diagram illustrating a routine for coreference resolution according to another embodiment.

With reference to FIGS. 2-4, illustrative routines will be described in detail according to some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 2, an illustrative routine 200 for coreference resolution according to one embodiment will be described in detail. The routine 200 begins at operation 202, where a segment of text is received. The segment of text includes one or more mentions that correspond to entities. The entities may correspond to person entities, temporal entities, organization entities, and/or location entities. The routine 200 proceeds from operation 202 to operation 204, where a first feature vector is generated based on features associated with a first one of the mentions. Next, at operation 206, a second feature vector is generated based on features associated with a second one of the mentions. One or more of the features associated with the first one of the mentions and the second one of the mentions may have an assigned weight that is higher or lower than an assigned weight of one or more of the other features. A Maximum Likelihood Estimation ("MLE") approach may be utilized to assign weights. The features may include contextual features, non-contextual features, temporal features, and/or location features. The contextual features may include assertions, associations, and/or assigned roles. Assertions may be defined as subject-predicate-object relations. Associations can relate to aggregating mentions according to their text and role (entity, predicate, number, punctuation, etc.) to form clusters of mentions. Associations may include "same-sentence" or "same-document" relationship information. The non-contextual features may include parts of speech, titles, first characters, next characters, prefixes, and/or suffixes.

Figure 5:
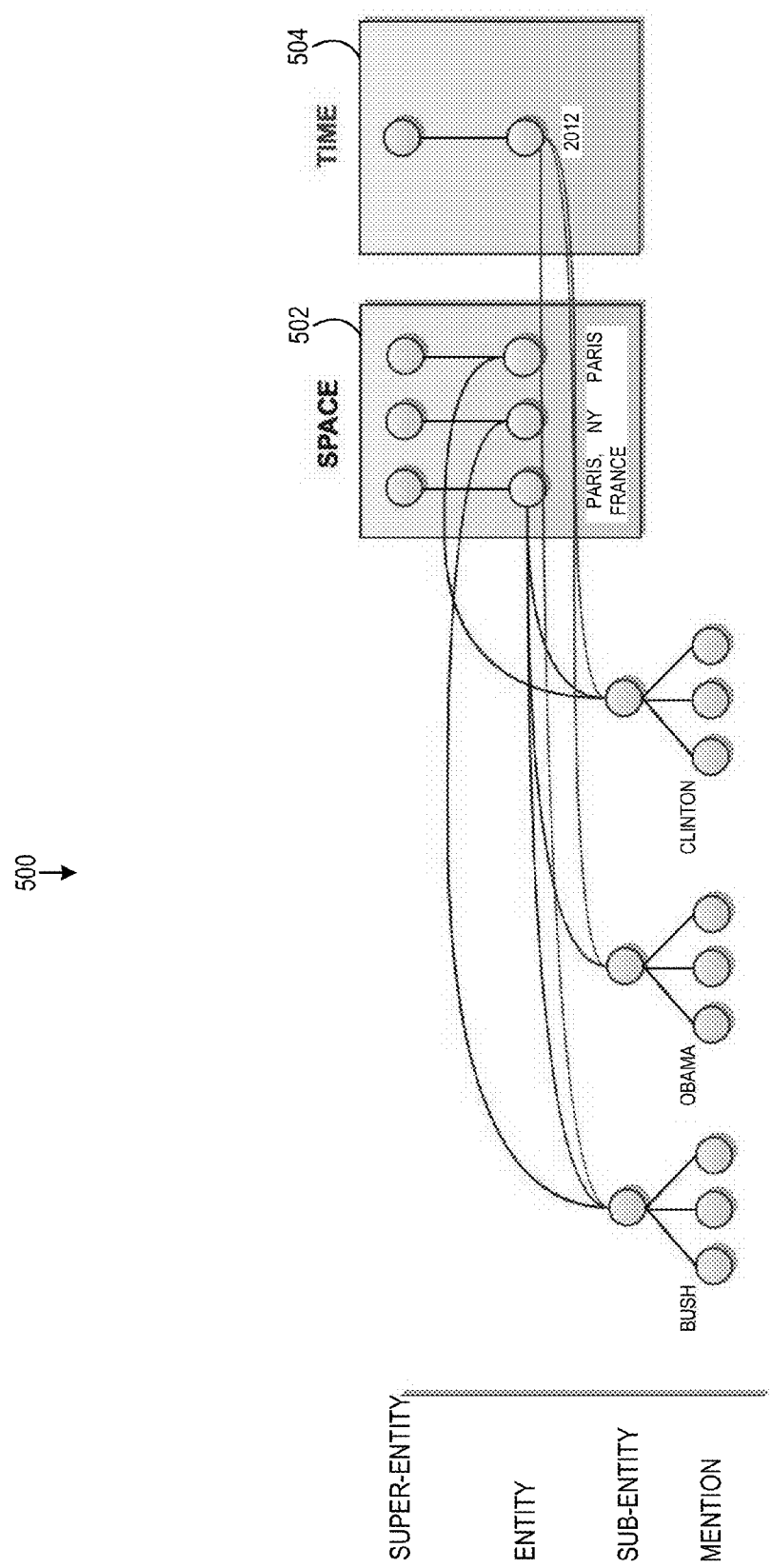
FIG. 5 is a diagram illustrating an exemplary application of the coreference resolution technologies presented herein according to one embodiment.

From operation 206, the routine 200 proceeds to operation 208, where a measure of similarity is computed between the first feature vector and the second feature vector. The measure of similarity may represent a degree or amount by which the first one of the mentions and the second one of the mentions correspond to the same entity. The similarity metric may be computed by using a weighted sum of the individual similarities of space feature vectors, time feature vectors, contextual feature vectors, and non-contextual feature vectors. Factor graphs and pairwise factor modeling, for example as described in "Large-Scale Cross-Document Coreference Using Distributed Inference and Hierarchical Models," by S. Singh, A. Subramanya, F. Pereira, and A. McCallum ("Singh et al.") may be used in computing the similarity metric, which involves capturing similarity between all pairs of mentions using cosine similarity of mention context pairs. Those skilled in the art will recognize that many other techniques are also available to be used for calculating similarity metrics. Each of the entities may be associated with a level of a hierarchical structure that defines a plurality of entity levels, and the measure of similarity may be computed by dynamically organizing mentions based on the hierarchical structure. An exemplary hierarchical structure which may be utilized is described in Singh et al., in which "sub-entity" variables represent clusters of similar mentions that are likely to be coreferent, which are then used to propose composite jumps that move multiple mentions together, and wherein "super-entity" variables represent clusters of similar entities. An exemplary embodiment of dynamic organization based on a hierarchical structure of entity levels is shown in FIG. 5.

The routine 200 proceeds from operation 208 to operation 210, where it is determined whether the first one of the mentions and the second one of the mentions both correspond, that is, refer, to the same entity. The determination is made based on the computed measure of similarity between the first feature vector and the second feature vector. The determination may be performed by dynamically organizing mentions based on the hierarchical structure. The dynamic organization may include aggregating mentions upwards from a lower level of the hierarchical structure to a higher level of the hierarchical structure. Dynamic organization may include the use of one or more dimension reduction techniques, including semantic hashing. Semantic hashing may generally be defined as a dimensional reduction method in which hash functions are used to map a feature vector existing in a high-dimensional vector space to a vector that exists in a space of lower dimension. The mapping is defined such that feature vectors similar in the original space are mapped with high probability to vectors similar in the hash space. The determination may additionally or alternatively be performed according to a threshold-type comparison as illustrated in FIG. 3. Following operation 210, the routine 200 ends.

Now referring to FIG. 3, an illustrative routine 300 for determining whether a first mention and a second mention both correspond to the same entity, according to one embodiment, will be described. The routine 300 begins at operation 302, where a measure of similarity between a first feature vector and a second feature vector is computed and compared to a threshold degree or amount of similarity. The measure of similarity represents a degree or amount by which the first mention and the second mention both correspond to the same entity. The threshold degree or amount may be set to a level of confidence that is acceptable, such as a value for a degree or amount of similarity above which there is high confidence that the first mention and the second mention correspond to the same entity. If the computed measure of similarity exceeds the threshold amount or degree, the routine 300 proceeds from operation 302 to operation 304, where the first mention and the second mention are identified as corresponding to the same entity. Following operation 304, the routine 300 ends. If it is determined at operation 302 that the computed measure of similarity does not exceed the threshold amount or degree, the routine 300 ends.

Now referring to FIG. 4, an illustrative routine 400 for coreference resolution according to one embodiment will be described in detail. The routine 400 begins at operation 402, where a segment of text is received. The segment of text includes one or more mentions that correspond to entities. The entities may correspond to person entities, temporal entities, organization entities, and/or location entities. One or more of the features associated with first mentions and/or second mentions may have an assigned weight that is higher or lower than an assigned weight of one or more of the other features. The features may include contextual features, non-contextual features, temporal features, and/or location features. The contextual features may include assertions, associations, and/or assigned roles. The non-contextual features may include parts of speech, titles, first characters, next characters, prefixes, and/or suffixes.

From operation 402, the routine 400 proceeds to operation 404, where one or more first mentions and one or more second mentions are dynamically organized based on a hierarchical structure defining entity levels. As described above with reference to FIG. 2, dynamic organization may be performed according to a dimensional reduction technique, which may use semantic hashing, and may include aggregating mentions upwards from a lower level of the hierarchical structure to a higher level of the hierarchical structure. From operation 404, the routine 400 proceeds to operation 404, where one or more of the first mentions and second mentions that correspond to the same entity are identified. Following operation 404, the routine 400 ends.

Referring now to FIG. 5, an exemplary implementation of coreference resolution according to one embodiment will be described in detail. As shown, a hierarchical structured model 500 has four entity levels: a super-entity level, entity level, sub-entity level, and mention level.

The following exemplary implementation is based on a sample of three sentences: Bush, Obama and Clinton attended the 2012 peace conference in Paris, France. While in conference, Bush got a call and left for NY. Meanwhile, Clinton enjoyed his Paris stay. Within these three sentences, there are five occurrences of person entities, namely the United States presidents (George Bush, Barack Obama, and Bill Clinton), and three occurrences of location entities, namely NY (New York), Paris, and finally Paris, France. There is also one time entity, namely 2012. The dependencies among these entities can be expressed at the sentence level, where each of the person entities has a dependency on both the location entity and time entity occurring in the sentence. There are three location dependencies in the first sentence, which are: Paris, France and Bush; Paris, France and Obama; and Paris, France and Clinton. Similarly, there are three time dependencies between 2012 and the three U.S. presidents. As shown, the first sentence and third sentence each has an occurrence of Clinton. The likelihood that both of these occurrences of Clinton refer to U.S. president Bill Clinton can be predicted by utilizing the location dependency Paris from both of the sentences.

For the "Clinton" sub-entity, the "Space" featured set 502 contains: 1) "Paris, France"; and 2) "Paris." For the "Bush" sub-entity, the "Space" feature set 502 contains: 1) "Paris, France"; and 2) "NY." Accordingly, a similarity comparison for any given two sub-entities can be dependent on how similar the individual contextual, non-contextual, space and time feature vectors are. It should be appreciated that the same logic could be applied to determine that Paris and Paris, France are essentially the same.

FIG. 6 is a computer architecture diagram showing illustrative computer hardware architecture for a computing system capable of implementing the embodiments presented herein. As an exemplary implementation, a computer 600 may include one or more of the functional components shown in FIG. 1 and/or be configured to perform one or more functions associated with embodiments illustrated in FIGS. 2-5. The computer 600 includes a processing unit 602, a system memory 604, and a system bus 606 that couples the memory 604 to the processing unit 602. The computer 600 further includes a mass storage device 612 for storing program modules. The program module 614 may include modules for the natural language processing 106, entity extraction 110, data encoding 124, and/or analytics processes 126 described with reference to FIG. 1.

The mass storage device 612 further includes a data store 616, which may include the element store 116 and/or analytics store 118 shown in FIG. 1. The mass storage device 612 is connected to the processing unit 602 through a mass storage controller (not shown) connected to the bus 606. The mass storage device 612 and its associated computer-storage media provide non-volatile storage for the computer 600. Although the description of computer-storage media contained herein refers to a mass storage device, such as a hard disk or CD-ROM drive, it should be appreciated by those skilled in the art that computer-storage media can be any available computer storage media that can be accessed by the computer 600.

By way of example, and not limitation, computer-storage media may include volatile and non-volatile, removable and non-removable media implemented in any method or technology for storage of information such as computer-storage instructions, data structures, program modules, or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600. Computer storage media does not include transitory signals.

According to various embodiments, the computer 600 may operate in a networked environment using logical connections to remote computers through a network 618. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices. The bus 606 may enable the processing unit 602 to read code and/or data to/from the mass storage device 612 or other computer-storage media. The computer-storage media may represent apparatus in the form of storage elements that are implemented using any suitable technology, including but not limited to semiconductors, magnetic materials, optics, or the like.

The program module 614 may include software instructions that, when loaded into the processing unit 602 and executed, cause the computer 600 to provide functions for coreference resolution. The program module 614 may also provide various tools or techniques by which the computer 600 may participate within the overall systems or operating environments using the components, flows, and data structures discussed throughout this description. In general, the program module 614 may, when loaded into the processing unit 602 and executed, transform the processing unit 602 and the overall computer 600 from a general-purpose computing system into a special-purpose computing system. The processing unit 602 may be constructed from any number of transistors or other discrete circuit elements, which may individually or collectively assume any number of states. More specifically, the processing unit 602 may operate as a finite-state machine, in response to executable instructions contained within the program module 614. These computer-executable instructions may transform the processing unit 602 by specifying how the processing unit 602 transitions between states, thereby transforming the transistors or other discrete hardware elements constituting the processing unit 602.

Encoding the program module 614 may also transform the physical structure of the computer-storage media. The specific transformation of physical structure may depend on various factors, in different implementations of this description. Examples of such factors may include, but are not limited to: the technology used to implement the computer-storage media, whether the computer storage media are characterized as primary or secondary storage, and the like. For example, if the computer-storage media are implemented as semiconductor-based memory, the program module 614 may transform the physical state of the semiconductor memory, when the software is encoded therein. For example, the program modules 614 may transform the state of transistors, capacitors, or other discrete circuit elements constituting the semiconductor memory.

As another example, the computer-storage media may be implemented using magnetic or optical technology. In such implementations, the program modules 614 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for coreference resolution, comprising:
  receiving a segment of text comprising a plurality of mentions corresponding to entities;
  generating a first feature vector based on at least one feature associated with a first mention;
  generating a second feature vector based on at least one feature associated with a second mention;
  computing a measure of similarity between the first feature vector and second feature vector; and
  based on the computed measure of similarity, determining if the first mention and the second mention both correspond to the same entity.

2. The computer-implemented method of claim 1, wherein the at least one feature associated with the first mention, and the at least one feature associated with the second mention, comprises at least one of assertions, associations, same-sentence features, same-document features, temporal features and geolocation features.

3. The computer-implemented method of claim 1, wherein each of the entities is associated with a level of a hierarchical structure defining a plurality of entity levels.

4. The computer-implemented method of claim 3, wherein at least one of computing the measure of similarity between the first feature vector and second feature vector and determining if the first mention and the second mention both correspond to the same entity comprises dynamically organizing mentions based on the hierarchical structure.

5. The computer-implemented method of claim 4, wherein dynamically organizing the mentions comprises dimensional reduction.

6. The computer-implemented method of claim 5, wherein the dimensional reduction comprises semantic hashing.

7. The computer-implemented method of claim 1, wherein at least one of the features associated with the first mention and the second mention has an assigned weight that is higher or lower than an assigned weight of at least one of the other features.

8. The computer-implemented method of claim 1, wherein the measure of similarity represents a degree or amount by which the first mention and second mention both correspond to the same entity.

9. The computer-implemented method of claim 8, wherein determining if the first mention and the second mention both correspond to the same entity comprises
  determining if the degree or amount by which the first mention and second mention both correspond to the same entity exceeds a predetermined threshold, and
  upon determining that the degree or amount by which the first mention and second mention both correspond to the same entity exceeds the predetermined threshold, identifying the first mention and second mention as corresponding to the same entity.

10. A system for coreference resolution, comprising:
  a processing unit;
  a memory operatively coupled to the processing unit; and
  a program module which executes in the processing unit from the memory and which, when executed by the processing unit, causes the computer system to receive a segment of text comprising a plurality of mentions corresponding to entities;

generate a first feature vector based on at least one feature associated with at least one first mention;

generate a second feature vector based on at least one feature associated with at least one second mention;

compute a measure of similarity between the first feature vector and second feature vector; and based on the computed measure of similarity, determine if the at least one first mention and the at least one second mention both correspond to the same entity.

11. The system of claim 10, wherein the at least one feature associated with the at least one first mention, and the at least one feature associated with the at least one second mention, comprise at least one of assertion features, association features, same-sentence features, same-document features, temporal features, and geolocation features.

12. The system of claim 10, wherein each of the entities is associated with a level of a hierarchical structure defining a plurality of entity levels.

13. The system of claim 12, wherein at least one of computing the measure of similarity between the first feature vector and second feature vector and determining if the at least one first mention and the at least one second mention both correspond to the same entity comprises dynamically organizing the at least one first mention and at least one second mention based on the hierarchical structure.

14. The system of claim 13, wherein dynamically organizing the at least one first mention and at least one second mention comprises aggregating the at least one first mention and at least one second mention upward from a lower level of the hierarchical structure to a higher level of the hierarchical structure.

15. The system of claim 14, wherein dynamically organizing the at least one first mention and at least one second mention comprises dimensional reduction.

16. The system of claim 15, wherein the dimensional reduction comprises semantic hashing.

17. The system of claim 10, wherein the at least one first mention comprises a plurality of first mentions and the at least one second mention comprises a plurality of second mentions.

18. The system of claim 10, wherein at least one of the features associated with the at least one first mention and the at least one second mention has an assigned weight that is higher or lower than an assigned weight of at least one of the other features.

19. The system of claim 10, wherein the measure of similarity represents a degree or amount by which the at least one first mention and at least one second mention both correspond to the same entity.

20. The system of claim 19, wherein determining if the at least one first mention and the at least one second mention both correspond to the same entity comprises determining if the degree or amount by which the at least one first mention and the at least one second mention both correspond to the same entity exceeds a predetermined threshold, and upon determining that the degree or amount by which the at least one first mention and the at least one second mention both correspond to the same entity exceeds the predetermined threshold, identifying the at least one first mention and at least one second mention as corresponding to the same entity.

21. The system of claim 10, wherein the at least one feature associated with the at least one first mention and the at least one feature associated with the at least one second mention comprises at least one of parts of speech, titles, first characters, next characters, prefixes, and suffixes.

22. A computer-readable storage medium having computer-executable instructions stored thereon which, when executed by a computer, cause the computer to:

receive a segment of text comprising a plurality of mentions corresponding to entities;

generate at least one first feature vector based on at least one feature associated with a plurality of first mentions;

generate at least one second feature vector based on at least one feature associated with a plurality of second mentions;

compute a measure of similarity between the at least one first feature vector and at least one second feature vector; and based on the computed measure of similarity, determine if at least one of the plurality of first mentions and at least one of the plurality of second mentions both correspond to the same entity.

23. The computer-readable storage medium of claim 22, wherein the at least one feature associated with the plurality of first mentions, and the at least one feature associated with the plurality of second mentions, comprises at least one of assertions, associations, same-sentence features, same-document features, temporal features and geolocation features.

24. The computer-readable storage medium of claim 22, wherein each of the entities is associated with a level of a hierarchical structure defining a plurality of entity levels.

25. The computer-readable storage medium of claim 24, wherein at least one of computing the measure of similarity between the first feature vector and second feature vector and determining if the at least one first mention and the at least one second mention both correspond to the same entity comprises dynamically organizing the at least one first mention and at least one second mention based on the hierarchical structure.

26. The computer-readable storage medium of claim 25, wherein dynamically organizing the at least one first mention and at least one second mention comprises dimensional reduction by semantic hashing.

* * * * *